United States Patent [19]

Thomas

[11] 4,269,560
[45] May 26, 1981

[54] STEERING ASSEMBLY
[75] Inventor: Dennis R. Thomas, Brimfield, Ill.
[73] Assignee: Kress Corporation, Brimfield, Ill.
[21] Appl. No.: 80,537
[22] Filed: Oct. 1, 1979
[51] Int. Cl.³ .............................................. B62D 5/06
[52] U.S. Cl. .................... 414/459; 180/140; 180/159; 180/160
[58] Field of Search ............... 180/9.46, 74, 24.01, 180/234, 253, 252, 79, 24, 79.1, 79.5, 145, 236, 132–163; 280/81.5, 6 H, 96.3, 773, 103, 43.23, 91, DIG. 14, 95R, 80 R, 98, 99; 414/458, 459, 460

[56] References Cited

U.S. PATENT DOCUMENTS

| | | | |
|---|---|---|---|
| 3,051,063 | 8/1962 | Roberts | 180/161 X |
| 3,570,695 | 3/1971 | Schwartz | 414/460 |
| 4,120,507 | 10/1978 | Miller | 180/9.46 |
| 4,143,781 | 3/1979 | Lenius et al. | 180/140 |

Primary Examiner—John J. Love
Assistant Examiner—Randall A. Schrecengost

[57] ABSTRACT

A straddle carrier for heavy loads of the type which is driven over a load so that the load is generally beneath the carrier and straddled by the wheels of the carrier. The carrier includes a main frame which has a gripping tong mechanism integrally mounted thereon for clamping the load. The entire main frame and tong assembly may be raised and lowered to permit handling the load by means of cylinder/strut arrangements at each of the four wheels. A linkage comprising extensions from the wheel carrying members and a steering cross bar associated with each of the front and rear pairs of wheels is hydraulically activated independently of the main frame to permit steering the vehicle from any elevation. Mounted on the main frame, and like the main frame lowered and raised relative to the wheels, are an operator's cab and a motor and pump housing for driving the straddle carrier and actuating the various hydraulic cylinders of the carrier.

11 Claims, 4 Drawing Figures

STEERING ASSEMBLY

DESCRIPTION OF THE INVENTION

This invention relates generally to a steering assembly for a wheeled vehicle and more particularly to such a steering assembly in which the steering force is not applied directly through the vehicle frame.

Such a steering assembly is particularly applicable to a straddle carrier which has a common main frame for an operator's cab and a load-gripping mechanism where the main frame is operable to be raised and lowered relative to ground-engaging straddle carrier wheels.

Straddle carriers are used for transporting heavy loads such as steel slabs, weighing tens of tons. A typical straddle carrier is a large, four-wheeled, motorized vehicle having an elevated cab-bearing platform. The straddle carrier includes a load handling mechanism which is mounted beneath the platform of the straddle carrier and also means for raising and lowering the load handling mechanism. This load handling mechanism includes a frame, separate from the frame of the cab-bearing platform, upon which gripping means such as tongs are mounted for gripping the load. The load handling mechanism further includes actuating means for moving the tongs or other gripping members between a position gripping the load and a position wherein the load is released.

In order to operate such a presently existing load handling straddle carrier, the carrier is driven over a load, the load handling mechanism is lowered with tongs separated over the load, the tongs are actuated to grip the load, the load handling mechanism and the load are raised to a carrying position, and the straddle carrier is driven to a desired location for unloading.

Most load handling equipment is designed from the ground up based upon the total loaded weight, i.e. the weight of the vehicle itself plus the payload. In a load handling straddle carrier such as has been described above, the use of both a cab-bearing platform frame and a separate load handling mechanism frame results in the weight of the carrier components often exceeding the weight of the load. For example, a typical unloaded straddle carrier of the type described might weigh 26 tons and have a load capacity of less than 23 tons, at its tong points resulting in a payload-to-weight ratio of about 0.88.

In order to improve this payload-to-weight ratio, a straddle carrier having an integral main frame and gripping mechanism is disclosed herein and in co-pending U.S. patent application Ser. No. 080,283. Since the main frame is moveable relative to the ground-engaging wheels of the straddle carrier, a mechanical linkage between the main frame and the wheels to effect the steering would be relatively complex and/or cumbersome.

It is therefore an object of this invention to provide a steering assembly for a wheeled vehicle, such as a straddle carrier, wherein the steering force for the wheels is not applied directly through the vehicle frame.

Other objects and advantages of the invention will become apparent upon reading the following detailed description and upon reference to the drawings, in which.

Figure 1:
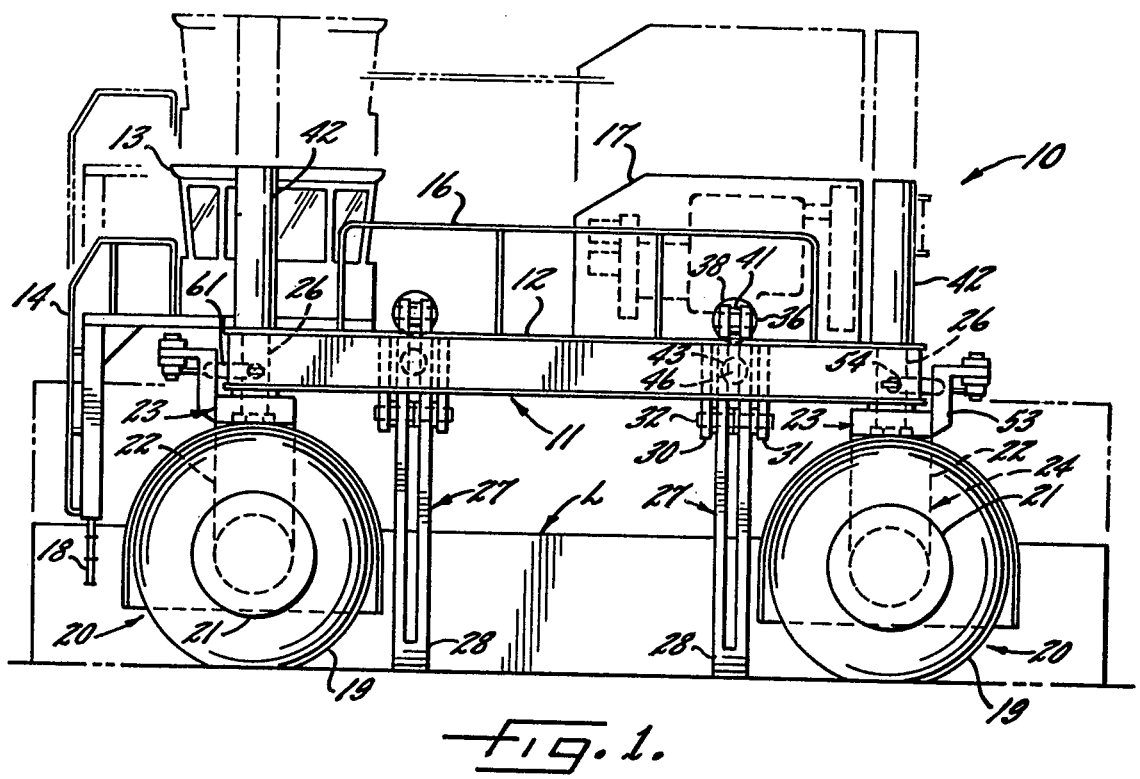
FIG. 1 is a side view of a straddle carrier according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

Turning now to the Figures, a straddle carrier 10 is shown which has a frame 11 encompassing a platform 12, mounted upon which there is an operator's cab 13. The operating controls for the straddle carrier 10 are located in cab 13, and an operator in the cab is provided a view of a load beneath the straddle carrier 10 through appropriate apertures or windows (not shown) in the platform. Steps 18 with hand rails 14 provide access to the platform 12 for the operator, and appropriate safety equipment such as a guard rail 16 is provided for persons moving about the platform 12. A motor housing 17 on the platform 12 encloses a motor driven hydraulic pump for providing pressurized hydraulic fluid to operate various hydraulic cylinders, to be described hereinafter, and to provide a hydrostatic drive for the straddle carrier wheels.

The straddle carrier includes four ground-engaging wheels 20, each having a tire 19 mounted on a rim 21. A wheel carrying member 22 is mounted on each wheel axle, the axle being rotatably received by the wheel carrying member. The wheel carrying member 22 has a downwardly extending portion 24 which receives the wheel axle, and the wheel carrying member also has an essentially horizontal upper portion 23 which includes means for attaching steering elements for the straddle carrier, as shall be described hereinafter. The upper portion 23 of the wheel carrying member 22 further has rigidly attached thereto an upwardly extending rod 26, which is received in a cylinder 42 associated with the frame 11 for raising and lowering the frame 11 and platform 12, as shall also be described more particularly hereinafter.

Two pairs of load-engaging tongs 27 are pivotally mounted on the frame 11. The pairs of tongs 27 are similar and are also similarly mounted and controlled, so only the rear pair of tongs 27, including a tong 28 and a tong 29, shall be described in detail. The upper portion of the tong 28 is pivotally mounted between two downwardly extending ears 30 and 31 of the frame 11 by a pin 32. Similarly, the tong 29 is pivotally mounted at its upper end between a pair of downwardly extending ears 33 and 35 of the frame 11 by a pin 34. For the purpose of pivoting the lower ends of the tongs together to grip a load and apart to release a load, the upper portion of the tong 28 is pivotally attached to a hydraulic cylinder 38. Similarly, the upper portion of the tong 29 is pivotally attached to a piston rod 39 received in hydraulic cylinder 38.

Figure 3:
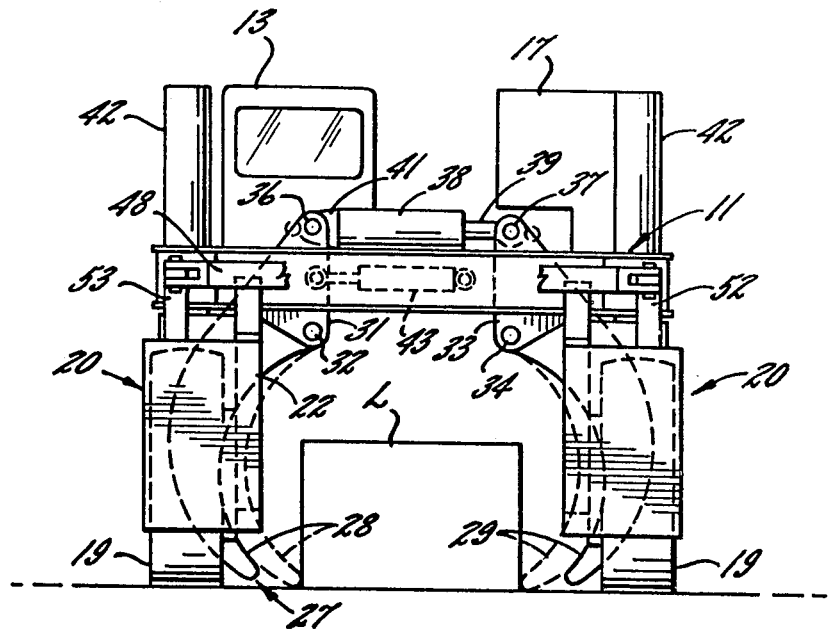
FIG. 3 is an end view of the straddle carrier of FIG. 1 with a portion of the steering mechanism removed, showing two load-gripping tong locations.
Figure 4:
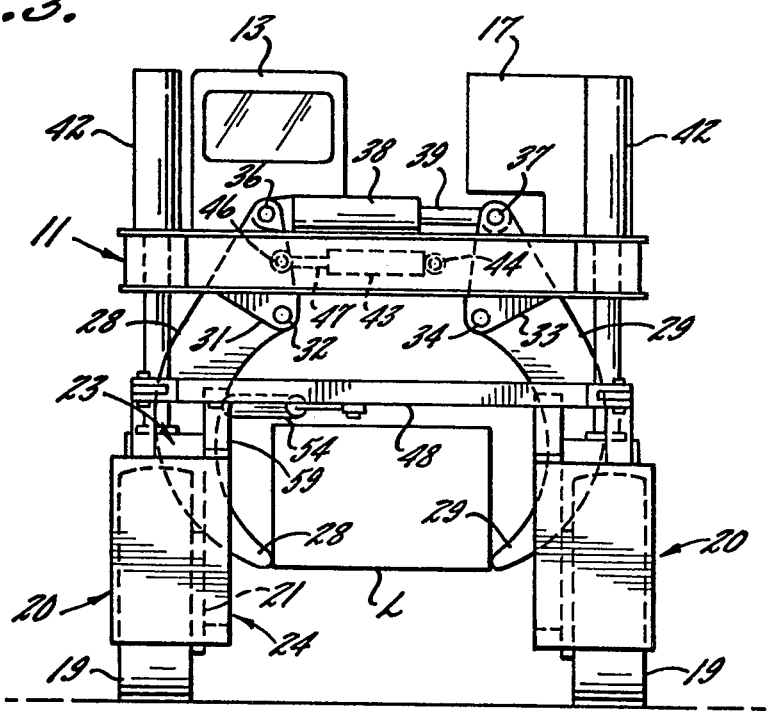
FIG. 4 is an end view similar to FIG. 3 but showing the frame and load in their elevated, carrying, position.

To hold the lower tong ends in a spaced apart relationship, such as for positioning the tongs on either side of a load, the hydraulic cylinder 38 is actuated to retract the rod 39 so that the tongs 28 and 29 pivot on the pins 32 and 34, respectively, drawing the upper portions of the tongs together and separating the lower end portions of the tongs. The tongs 28 and 29 are shown in solid lines in FIG. 3 in this spaced apart relationship. The dashed line showing of the tongs 28 and 29 in FIG. 3 illustrates the position of the lower tong ends moved together in engagement with a load L. To place the lower tong ends in this load engaging position, the hydraulic cylinder 38 is actuated to extend the rod 39 to the position as shown in FIG. 4.

The tongs 28 and 29 are bifurcated with the upper portions of the tongs being received on either side of a flange 41 of the cylinder 38 and attached for pivotal connections by a pin 36. Similarly, the end of the rod 39 is pivotally attached by a pin 37 within the bifurcated upper end of the tong 29.

In order to lift a load L, the tong pairs 27 are actuated by the hydraulic cylinders 38 to grip the load, and the frame 11 upon which the tong pairs are mounted is raised and lowered on the four rods 26 associated with the wheels. The rods 26 are received in hydraulic cylinders 42 which are rigidly attached to the frame 11. The hydraulic cylinders 42 may be activated to extend the rods 26 to raise the frame 11 and the tong pairs 27 to a carrying position for movement of the straddle carrier and, conversely, may be activated to retract the rods 26 to lower the frame and tong pairs to pick up a load or unload. The cylinders 42 in the preferred construction are of the type disclosed in U.S. Pat. No. 3,722,874, which includes both a compressible and a non-compressible fluid in order to provide shock absorption within the cylinder itself in addition to providing lifting and lowering capability. The operation of the hydraulic cylinders 42 is controlled by an operator in the cab 13.

In accordance with the invention, to steer the straddle carrier 10, hydraulically controlled steering cross bars 48 and 62 are provided between the front pair of wheels and the rear pair of wheels. Since the steering assemblies operate in similar fashion, only the rear steering mechanism shall be described in detail. Interconnecting the rear wheels is a steering cross bar 48 pivotally attached by pins 49 and 51 to cross bar support brackets 52 and 53, respectively. The steering cross bar support bracket 53 is rigidly attached to the upper portion 23 of the wheel carrying member 22. The bracket 53 extends upwardly from the upper portion of the wheel carrying member to provide clearance for a load such as L. The bracket 52 is similarly rigidly attached to the upper portion of its associated wheel carrying member 22.

For the purpose of turning the rear wheels of the straddle carrier 10, a hydraulically actuated cylinder 54 with a rod 56 is pivotally attached between the steering cross bar 48 and the wheel carrying member 22. The steering control cylinder 54 is hydraulically controlled from the cab 13, and when the rod 56 is extended, the steering cross bar 48, and hence the rear wheels, rotate counterclockwise as viewed from the top in FIG. 2. In similar fashion, when the steering rod 56 is retracted by the hydraulic cylinder 54, the steering cross bar 48 and the rear wheels rotate clockwise.

A pin 57 pivotally connects the end of the steering rod 56 to the steering cross bar 48, and the end of the steering cylinder 54 is pivotally connected by a pin 58 to an upwardly extending steering support bracket 59 which is rigidly mounted on the top portion 23 of the wheel carrying member 22. A similar steering cylinder 61 is provided for a steering cross bar 62 for the front wheels and operates in the same manner as the rear steering assembly. The front and rear steering mechanisms are separately operable, enhancing the maneuverability of the straddle carrier.

The rear wheels rotate in unison due to the steering cross bar 48, which serves as a shifting side of a "parallelogram" defined by pins 49 and 51 and the upwardly extending rods 26 of the rear wheel carrying members. Greater steering torque is developed by locating the pivotal attachment of the piston rod 56 (at pin 57) further along the steering cross bar 48 from the pin 51 which attaches the cross bar to the wheel carrying member 22. The distance between the pins 51 and 57 must, in any event, be greater, preferably substantially greater, than the distance between the hydraulic cylinder pin 58 and the axis of the rod 26 for the cylinder to exert a significant lateral force component on the bar 48 through the pin 57 over a wide range of wheel positions. For additional steering force an optional second hydraulic cylinder may be mounted between the other rear wheel carrying member 65 and the steering cross bar 48 in similar fashion to the hydraulic cylinder 54. Such a second rear hydraulic cylinder would extend its associated rod when the rod 56 was being retracted by the cylinder 54 and vice versa. A second front steering cylinder may also be employed to cooperate with the cylinder 61. It will be appreciated that by connecting the steering cylinders between elements of the linkage, with no connections to the vehicle frame (other than flexible hydraulic lines), the frame elevation relative to the wheels may be controlled independently of and without effect upon the vehicle's steering capability.

The various cylinders of the straddle carrier 10 are controlled from the cab 13 by an operator through hydraulic lines running to the various cylinders. A sufficiently flexible connection is made to the steering cylinders 54 and 61 in order to accomodate the distance of travel of the frame 11 relative to the wheels. Hydrostatic drive for at least one pair of wheels of the straddle carrier 10 is provided with drive control also in the cab 13 for the operator of the straddle carrier.

So far as has been described, when the frame 11 is in its raised position, the tong pairs 27 may swing laterally, or when cornering. With reference, for example, to FIG. 3, the pins 32, 34, 36 and 37 define a quadrilateral whose apices represent pivotal connections to the tongs 28 and 29. With the tong 28 pivotally attached to the frame 11 by pin 32 and with the tong 29 pivotally attached to the frame 11 by pin 34, there is a tendency for the tongs to swing laterally with the cylinder 38 and its associated rod 39 fixed relative to one another but moving laterally relative to the frame. The resultant pivoting of the upper portions of the tongs 28 and 29 about the pins 32 and 34, respectively, results in an even greater lateral motion of the lower ends of the tongs. In order to stabilize the tong pairs 27, an additional tong-stabilizing cylinder 43 is provided for each of the front and rear pairs 27. Describing the cylinder associated with the rear pair of tongs 28 and 29, the stabilizing cylinder 43 is attached at an end 44 to the frame 11 and has an associated rod 47 which is attached at an end 46 to the tong 28. When the tong pairs 27 are raised, the cylinder 43 is hydraulically actuated by the operator of the straddle carrier to restrain the tongs from swinging.

Figure 2:
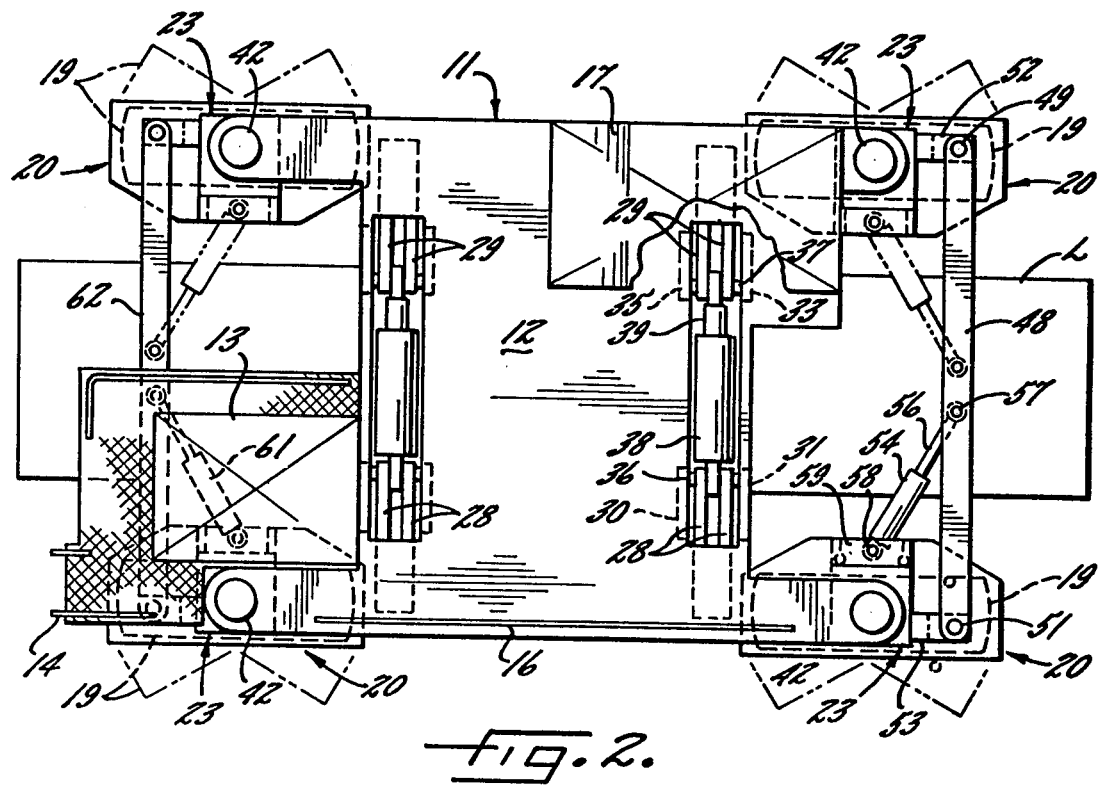
FIG. 2 is a top view of the straddle carrier of FIG. 1, with a portion of a pump housing removed.

In operation, the straddle carrier 10 is driven by an operator with the tong pairs 27 and the frame 11 in an elevated position. The straddle carrier 10 is then driven into a loading position relative to a load L, as shown in FIGS. 1 through 3. The tong pairs 27 are then lowered as shown in FIG. 3 in solid lines to generally encompass the load L. Next the cylinder 38 is activated by the straddle carrier operator from the cab 13 to extend the rod 39, bringing the lower ends of the tongs together to grip the load L as shown in dashed lines in FIG. 3. The frame-lifting cylinders 42 are then activated by the operator in the cab 13 to raise the frame 11, the tong pairs 27, and the load L to a raised, carrying position as shown in FIG. 4. The straddle carrier 10 is driven by the operator to the desired location for unloading the load L. Unloading is accomplished by lowering the frame 11, the tong pairs 27, and the load L, and activating each tong cylinder 38, front and rear, to retract its associated rod 39; thereby separating the lower ends of the tongs.

While the straddle carrier 10 has been shown incorporating the particular tong pairs 27, other types of gripping members may be used depending upon the particular shape of a load which is to be carried.

With the integral tong and cab-bearing frame construction illustrated herein, a load may be carried which exceeds the total straddle carrier weight. For example, it is contemplated that a straddle carrier of the presently disclosed construction having a total weight of about 40 tons would be able to carry a load of up to 60 tons.

While neither specific hydraulic pump and line connection details nor specific hydrostatic drive particulars have been illustrated, their implementation is well within the state of the art. The essential consideration is that the connections to the lifting and steering drives and the drive for the wheels are not affected by the relative motion between the frame and the wheels.

It can be seen, therefore, from the foregoing description, that a steering assembly for a wheeled vehicle has been provided wherein the steering force for the wheels is not provided directly through the vehicle.

What is claimed is:

1. A steering assembly for a wheeled vehicle having a frame and comprising:
   two wheel carrying members, each having a wheel mounted thereon for rotation about a first axis and each being received by the vehicle frame for limited rotation relative thereto about a second axis;
   a steering cross bar pivotally attached to each of the wheel carrying members, each attachment point being spaced apart from the second axis of rotation; and
   means, pivotally attached to the steering cross bar at a first point and to one of the wheel carrying members at a second point, for increasing and decreasing the distance between said first and second points, whereby the wheel carrying members are rotated and the wheels turned for steering.

2. The steering assembly of claim 1 in which the means for increasing and decreasing comprises a hydraulic cylinder.

3. The steering assembly of claim 1 in which the means for increasing and decreasing comprises a hydraulic cylinder and piston rod assembly having a cylinder end and a distal rod end, one end of the cylinder and piston rod assembly being pivotally attached to the steering cross bar and the other end of the cylinder and piston rod assembly being pivotally attached to one of the wheel carrying members.

4. The steering assembly of claim 1 which further comprises an additional two wheel carrying members, additional steering cross bar, and additional means for increasing and decreasing.

5. The steering assembly of claim 3 in which said first point of pivotal attachment of the means for increasing and decreasing is intermediate of the pivotal attachment points of the steering cross bar to the wheel carrying members.

6. The steering assembly of claim 5 in which each wheel carrying member includes an elongated rod portion, each said rod portion being received by the vehicle frame for rotation about the axis of said rod as said second axis of rotation and for translation along said second axis of rotation relative to said vehicle frame.

7. The steering assembly of claim 3 in which the means for increasing and decreasing further comprises a second hydraulic cylinder and piston rod assembly pivotally attached between the steering cross bar and the other of the two wheel carrying members.

8. A wheeled vehicle comprising:
   a plurality of spaced-apart, ground-engaging wheels;
   a plurality of wheel carrying members, each having a wheel of said plurality of wheels mounted thereon for rotation about a first axis;
   a main vehicle frame supported by the wheel carrying members, at least two of the wheel carrying members being received by the main vehicle frame for limited rotation about second axes of rotation;
   a steering cross bar pivotally attached to each of the said two wheel carrying members, each attachment point being spaced apart from the said second axes of rotation; and
   means, pivotally attached to the steering cross bar at a first point and pivotally attached to one of said two wheel carrying members at a second point, for increasing and decreasing the distance between said first and second points, whereby the said two wheel carrying members are rotated and their associated wheels turned for steering.

9. The vehicle of claim 8 in which an additional two wheel carrying members of the plurality of wheel carrying members are rotatably received by the main vehicle frame and which further comprises a second steering cross bar pivotally attached to each of said additional two wheel carrying members and second means, pivotally attached to the second steering cross bar at a first point and pivotally attached to one of said additional two wheel carrying members at a second point, for increasing and decreasing the distance between said points.

10. A straddle carrier for heavy loads comprising:
   a plurality of spaced-apart, ground-engaging wheels, the relative positions of the wheels generally defining a load-encompassing area;
   a plurality of wheel carrying members, each having a different wheel of said plurality of wheels mounted thereon for rotation about a first axis;
   a main frame supported by the wheel carrying members for vertical movement relative to the wheels, at least two of the wheel carrying members being received by the main frame for limited rotation about a second axis;
   gripping means mounted on the main frame for gripping a load in said load-encompassing area;
   means for raising and lowering the main frame and the gripping means relative to the wheels;
   a steering cross bar pivotally attached to each of the said at least two wheel carrying members, each attachment point being spaced apart from the second axis of rotation; and means, pivotally attached to the steering cross bar at a first point and to one of the said at least two wheel carrying members at a second point, for increasing and decreasing the distance between said first and second points, whereby the wheel carrying members are rotated and the wheels turned for steering.

11. The straddle carrier of claim 10 in which an additional two wheel carrying members of the plurality of wheel carrying members are rotatably received by the main frame and which further comprises a second steering cross bar pivotally attached to each of said additional two wheel carrying members and second means, pivotally attached to the second steering cross bar at a first point and pivotally attached to one of said additional two wheel carrying members at a second point, for increasing and decreasing the distance between said points.

* * * * *

UNITED STATES PATENT AND TRADEMARK OFFICE
CERTIFICATE OF CORRECTION

PATENT NO. : 4,269,560

DATED : May 26, 1981

INVENTOR(S) : Dennis R. Thomas

It is certified that error appears in the above—identified patent and that said Letters Patent is hereby corrected as shown below:

Column 1, line 53, after "Ser. No. 080,283" insert --filed October 1, 1979--

Signed and Sealed this

Twenty-fifth Day of August 1981

[SEAL]

*Attest:*

*Attesting Officer*

GERALD J. MOSSINGHOFF

*Commissioner of Patents and Trademarks*